United States Patent
Belchuk (10) Patent No.: US 9,484,581 B2
(45) Date of Patent: Nov. 1, 2016

(54) INTEGRALLY MOLDED GASKET FOR A FUEL CELL ASSEMBLY

(71) Applicant: Freudenberg-NOK General Partnership, Plymouth, MI (US)

(72) Inventor: Mark A. Belchuk, Windsor (CA)

(73) Assignee: FREUDENBERG-NOK GENERAL PARTNERSHIP, Plymouth, MI (US)

( * ) Notice: Subject to any disclaimer, the term of this patent is extended or adjusted under 35 U.S.C. 154(b) by 642 days.

(21) Appl. No.: 13/668,437

(22) Filed: Nov. 5, 2012

(65) Prior Publication Data

US 2013/0071772 A1 Mar. 21, 2013

Related U.S. Application Data

(62) Division of application No. 11/171,730, filed on Jun. 30, 2005, now abandoned.

(51) Int. Cl.
| | |
|---|---|
| *H01M 4/88* | (2006.01) |
| *H01M 8/02* | (2016.01) |
| *H01M 8/10* | (2016.01) |

(52) U.S. Cl.
CPC .............. *H01M 4/88* (2013.01); *H01M 8/0273* (2013.01); *H01M 8/0276* (2013.01); *H01M 8/0286* (2013.01); *H01M 8/1004* (2013.01); *H01M 8/0284* (2013.01); *H01M 2008/1095* (2013.01); *Y02E 60/521* (2013.01)

(58) Field of Classification Search
CPC ........... H01M 8/0273; H01M 8/0276; H01M 8/1004; H01M 8/0286; H01M 8/0284; H01M 4/88; H01M 2008/1095; Y02E 60/521

USPC ......................................................... 429/469
See application file for complete search history.

(56) References Cited

U.S. PATENT DOCUMENTS

| | | | |
|---|---|---|---|
| 6,020,083 A | 2/2000 | Breault et al. | |
| 6,057,054 A * | 5/2000 | Barton et al. | ................. 429/483 |
| 6,231,053 B1 | 5/2001 | Wakamatsu | |
| 6,350,538 B1 | 2/2002 | Wilkinson et al. | |
| 6,423,439 B1 | 7/2002 | Barton et al. | |

(Continued)

FOREIGN PATENT DOCUMENTS

| | | |
|---|---|---|
| EP | 1220345 B1 | 6/2010 |
| EP | 1152477 B1 | 10/2011 |

(Continued)

*Primary Examiner* — Milton I Cano
*Assistant Examiner* — Stephen Yanchuk
(74) *Attorney, Agent, or Firm* — Daniel J. Sepanik, Esq.; Harness, Dickey & Pierce, P.L.C.

(57) ABSTRACT

A fuel cell membrane electrode assembly (MEA) comprising first and second gas diffusion layers and an ion exchange membrane disposed between the diffusion layers. Each diffusion layer includes an inner surface facing the membrane, an outer surface opposite the inner surface, and a side surface defining a perimeter of the diffusion layers. An outboard region extends about the diffusion layers at the perimeter. The outboard region surrounds an inboard region. The outboard region has a low density region proximate to the side surface and a high density region between the low density region and the inboard portion. A seal is mounted at the low density region. The high density region prevents portions of the seal from entering the inboard region thereby damaging the MEA. The seal includes a first rim having a smaller radius than a second rim.

3 Claims, 4 Drawing Sheets

(56) References Cited

U.S. PATENT DOCUMENTS

| | | |
|---|---|---|
| 6,716,550 B1 | 4/2004 | Kirby et al. |
| 6,720,103 B1 | 4/2004 | Nagai |
| 6,814,359 B2 | 11/2004 | Senda et al. |
| 7,070,846 B2 | 7/2006 | Beistline et al. |
| 7,070,876 B2 | 7/2006 | Artibise et al. |
| 2001/0019790 A1 | 9/2001 | Regan et al. |
| 2002/0034670 A1 | 3/2002 | Suenaga et al. |
| 2002/0051902 A1 | 5/2002 | Suenaga et al. |
| 2003/0082429 A1 | 5/2003 | Nishimura et al. |
| 2003/0211378 A1 | 11/2003 | Wald et al. |
| 2003/0224237 A1 | 12/2003 | Vanderleeden et al. |
| 2004/0058223 A1* | 3/2004 | Shibata et al. .................. 429/38 |
| 2004/0096725 A1 | 5/2004 | Mao et al. |
| 2004/0191604 A1* | 9/2004 | Artibise et al. .................. 429/35 |
| 2007/0134531 A1* | 6/2007 | Kimura et al. .................. 429/32 |
| 2008/0118811 A1 | 5/2008 | Okabe |

FOREIGN PATENT DOCUMENTS

| | | | |
|---|---|---|---|
| JP | 05101837 A | | 4/1993 |
| WO | WO-98/33225 A1 | | 7/1998 |
| WO | WO-01/17048 A1 | | 3/2001 |
| WO | WO-02/93669 A3 | | 10/2003 |
| WO | WO-2005-045970 | * | 5/2005 |

\* cited by examiner

FIG 4

US 9,484,581 B2

INTEGRALLY MOLDED GASKET FOR A FUEL CELL ASSEMBLY

CROSS-REFERENCE TO RELATED APPLICATIONS

This application is a divisional of U.S. patent application Ser. No. 11/171,730 filed on Jun. 30, 2005 (now abandoned). The entire disclosure of the above application is incorporated herein by reference.

FIELD OF THE INVENTION

The present invention generally relates to fuel cells. More particularly, the present invention relates to an integrally molded gasket seal for a fuel cell membrane electrode assembly.

BACKGROUND OF THE INVENTION

Electrochemical fuel cells facilitate chemical reactions between hydrogen and oxygen to generate electrical current. The chemical reactions take place in one or more membrane electrode assemblies ("MEA"). Each MEA typically includes an ion exchange membrane disposed between two electrodes, which are also referred to as gas diffusion layers. Between each electrode and the membrane is a catalyst, the location of which defines an electrochemically active area of the MEA.

One electrode functions as a cathode and the other electrode functions as an anode. Typically, hydrogen is supplied to the anode and oxygen is supplied to the cathode. The hydrogen and oxygen are directed to the electrodes in separate manifolds.

The membrane acts as a barrier to isolate the hydrogen and oxygen to prevent short-circuiting of the MEA. The membrane restricts passage of oxygen and hydrogen, but permits protons to pass between the anode and the cathode. In many MEA's, the membrane extends laterally beyond the perimeter of each electrode layer. Extending the membrane beyond the two electrodes helps to prevent passage of oxygen and hydrogen between the electrodes at the perimeter edges of the electrodes, which can short-circuit the MEA.

To further isolate the hydrogen and oxygen molecules, a gasket seal is provided around the perimeter edge of the electrodes and over the portion of the membrane that extends beyond the electrodes. To enhance the effectiveness of the seal, the seal is impregnated within the electrodes, which are typically porous and have a uniform density. The seal is made of an elastomeric material and can include multiple beads or protrusions to further increase the effectiveness of the seal.

In operation, hydrogen gas ($H_2$) supplied to the anode reacts with the catalyst to split the $H_2$ molecule into two $H^+$ ions and two electrons. The electrons are conducted via the anode to an external circuit to provide current to the circuit that can be used for a variety of purposes, such as to power and turn a motor. The circuit next directs the electrons to the cathode side of the fuel cell.

Simultaneously, oxygen gas ($O_2$) supplied to the cathode reacts with the catalyst to form two oxygen atoms. Each of the oxygen atoms have a strong negative charge. This negative charge attracts the $H^+$ ions through the membrane. The $H^+$ ions combine with an oxygen atom and two of the electrons from the external circuit to form a water molecule ($H_2O$).

A single MEA produces only a small voltage. To increase the amount of voltage produced, multiple MEAs are often combined in a fuel cell stack in a manner that is commonly known in the art. The multiple MEA's are typically separated by flow field plates, which are commonly referred to as separator plates.

While existing MEAs are suitable for their intended use, they are subject to improvement. For example, portions of the elastomeric seal sometimes enter the MEA active area during the manufacturing process as the elastomer is impregnated within the MEA. The presence of elastomer in the active area is undesirable because it restricts movement of gases and other particles in the active area, thereby decreasing the effective size of the active area and decreasing the efficiency of the fuel cell. Therefore, there is a need for a device and method that prevents portions of the seal from entering the active area during the impregnation process.

Existing MEA's also experience problems due to the size of the gasket seal or the distance that the seal extends above or below the MEA. For example, if the seal is too large and thus protrudes too far above or below the MEA then the seal will not properly fit between the MEA and the neighboring separator plates of a fuel cell stack. Further, such large seals exert more stress on the seal/MEA interlock than smaller seals due to numerous factors, such as their volume and increased exposure to outside forces that can highly strain the seal, thus making it more likely that larger seals, rather than smaller seals, will become detached from the MEA or damage the MEA. Still further, larger seals may permit more hydrogen permeation as compared to smaller seals. On the other hand, larger seals are more effective than smaller seals at preventing gross leakage from the MEA into the surrounding environment. Thus, there is a need for a seal that realizes the advantages associated with both large and small seals, while at the same time overcomes the disadvantages of each.

SUMMARY OF THE INVENTION

The present invention provides for a fuel cell membrane electrode assembly (MEA) comprising first and second gas diffusion layers and an ion exchange membrane disposed between the diffusion layers. Each diffusion layer includes an inner surface facing the membrane, an outer surface opposite the inner surface, and a side surface defining a perimeter of the diffusion layers. An outboard region extends about the diffusion layers at the perimeter. The outboard region surrounds an inboard region. The outboard region has a low density region proximate to the side surface and a high density region between the low density region and the inboard portion. A seal is mounted at the low density region. The high density region prevents portions of the seal from entering the inboard region during the manufacturing process, thereby damaging the MEA.

Another aspect of the invention provides for a fuel cell membrane assembly having a first gas diffusion layer, a second gas diffusion layer, an ion exchange membrane disposed between the first and second gas diffusion layers, and a seal. Each one of the first and second gas diffusion layers include the following: an inner surface facing the ion exchange membrane; an outer surface opposite the inner surface; and a side surface between the outer surface and the inner surface defining a perimeter of the first and the second layers respectively. The seal has a first rim integral with a second rim. The first rim is mounted to the outer surface and the side surface of each of the first layer and the second layer. The second rim is laterally offset from the first and the second layers. The seal impregnates the first gas diffusion layer and the second gas diffusion layer to provide a barrier between the first and the second gas diffusion layers that is at least substantially impermeable to gas. The first rim has a smaller volume than the second rim.

A further aspect of the invention provides for a first support plate, a second support plate, and a membrane electrode assembly positioned between the first support plate and the second support plate. The membrane electrode assembly includes a first electrode, a second electrode, an ion exchange membrane, and a seal. The first electrode is adjacent to the first support plate. The second electrode is opposite the first electrode and adjacent the second support plate. The ion exchange membrane is disposed between the first electrode and the second electrode. Each one of the first electrode and the second electrode include: an inner surface facing the ion exchange membrane; an outer surface opposite the inner surface, the outer surface of the first electrode faces the first support plate and the outer surface of the second electrode faces the second support plate; a side surface between the outer surface and the inner surface defining a perimeter of the first and the second electrodes respectively; an outboard region extending about a periphery of each of the first electrode and the second electrode at the perimeter; and an inboard region at least substantially surrounded by the outboard region. The outboard region includes a low density region proximate to the side surface and a high density region that is inboard of, and adjacent to, the low density region. The seal impregnates the low density region of the outboard region to provide a barrier between the first and the second gas diffusion layers that is at least substantially impermeable to gas.

Yet an additional aspect of the invention provides for a method for manufacturing a fuel cell membrane electrode assembly having an ion exchange membrane affixed between a first gas diffusion layer and a second gas diffusion layer. The method comprises the following steps: positioning the first and the second gas diffusion layers between two halves of a thermo-mold assembly, each mold half having a protruding region that mirrors the location of a high density region to be formed in the first and second gas diffusion layers at an outboard region that extends about a periphery of the first and second diffusion layers; closing the mold halves under heat such that the protruding regions of the mold halves compress the first and the second diffusion layers at the high density regions to increase the density of the first and second diffusion layers at the high density regions; injecting an elastomeric material that is heated to a liquid within a cavity of the closed mold, the cavity located about the periphery of the membrane electrode assembly at a low density region that is outboard of the high density region, the liquid elastomer flows within the first and second diffusion layers at the low density region; and curing the liquid elastomeric material to form an elastomeric seal that is impregnated within the first and second diffusion layers at the low density region and extends around side surfaces at the periphery of the first and second diffusion layers.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
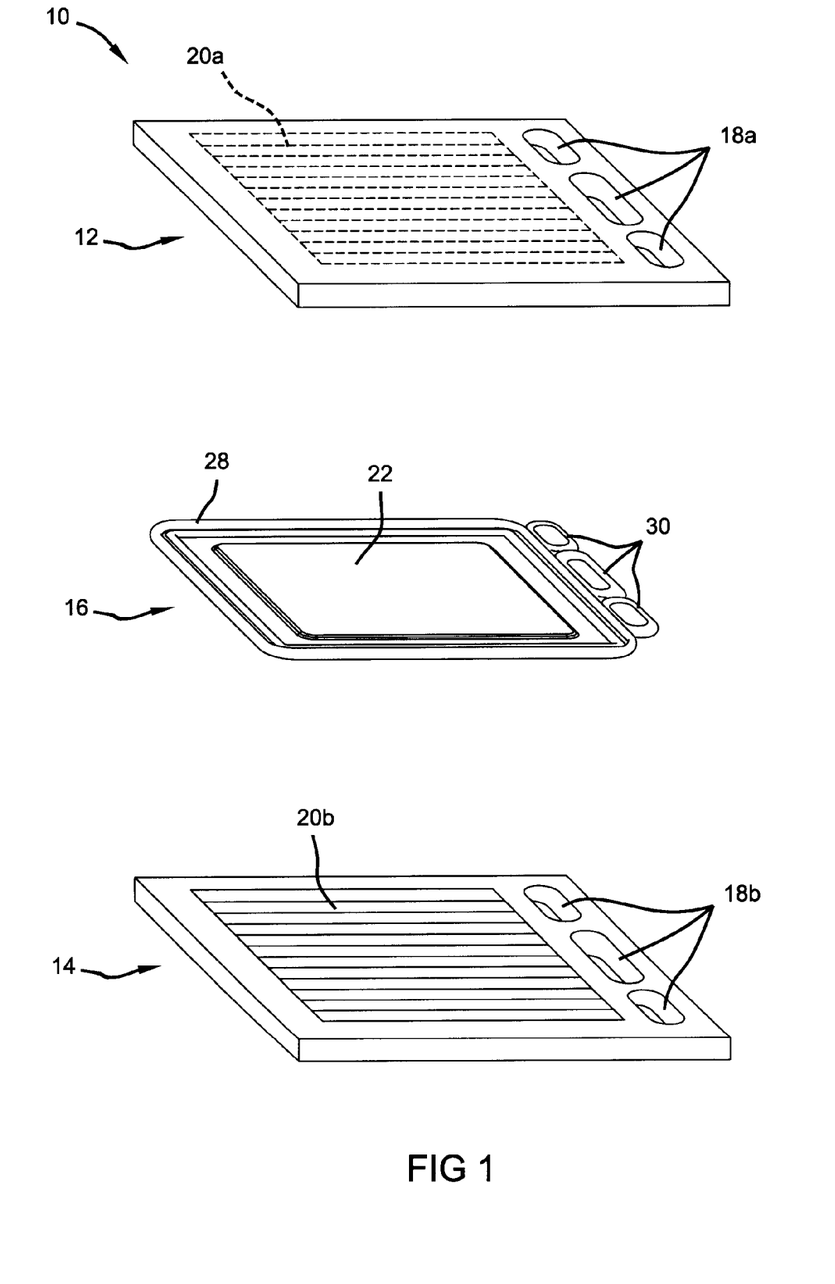
FIG. 1 is an exploded perspective view of a fuel cell assembly according to the teachings of the present invention comprising a membrane electrode assembly (MEA) disposed between two support plates.

A fuel cell assembly according to the teachings of the present invention is illustrated in FIG. 1 at reference numeral 10. The fuel cell 10 generally comprises a first support plate 12, a second support plate 14, and a membrane electrode assembly (MEA) 16 disposed between the first and second support plates 12 and 14. The plates 12 and 14 are mounted to opposite sides of the MEA 16.

The support plates 12 and 14 are substantially similar. Therefore, like reference numbers are used to designate features of the plates 12 and 14 that are similar or the same. When it is necessary to distinguish between the first and second plates 12 and 14, such as in the figures, the letter "a" is used to designate features of the first support plate 12 and the letter "b" is used to designate features of the second support plate 14.

Each of the support plates 12 and 14 include multiple manifold ports 18. The ports 18 can take a variety of different forms and can be provided at a variety of different locations within the plates 12 and 14. As illustrated, the ports 18 are located along an edge of each of the plates 12 and 14 and extend through each of the plates 12 and 14. Each of the ports 18 are separate passageways that keep different gases of the different ports 18 isolated from each other. The ports 18 of each of the plates 12 and 14 are in vertical alignment with each other.

Each of the support plates 12 and 14 further include flow field channels 20. The channels 20 are located within a surface of the plates 12 and 14 respectively that abuts the MEA 16. The channels 20 are in communication with one or more of the ports 18. The channels 20 are operable to distribute the gases supplied through the ports 18 to the MEA 16.

Figure 2:
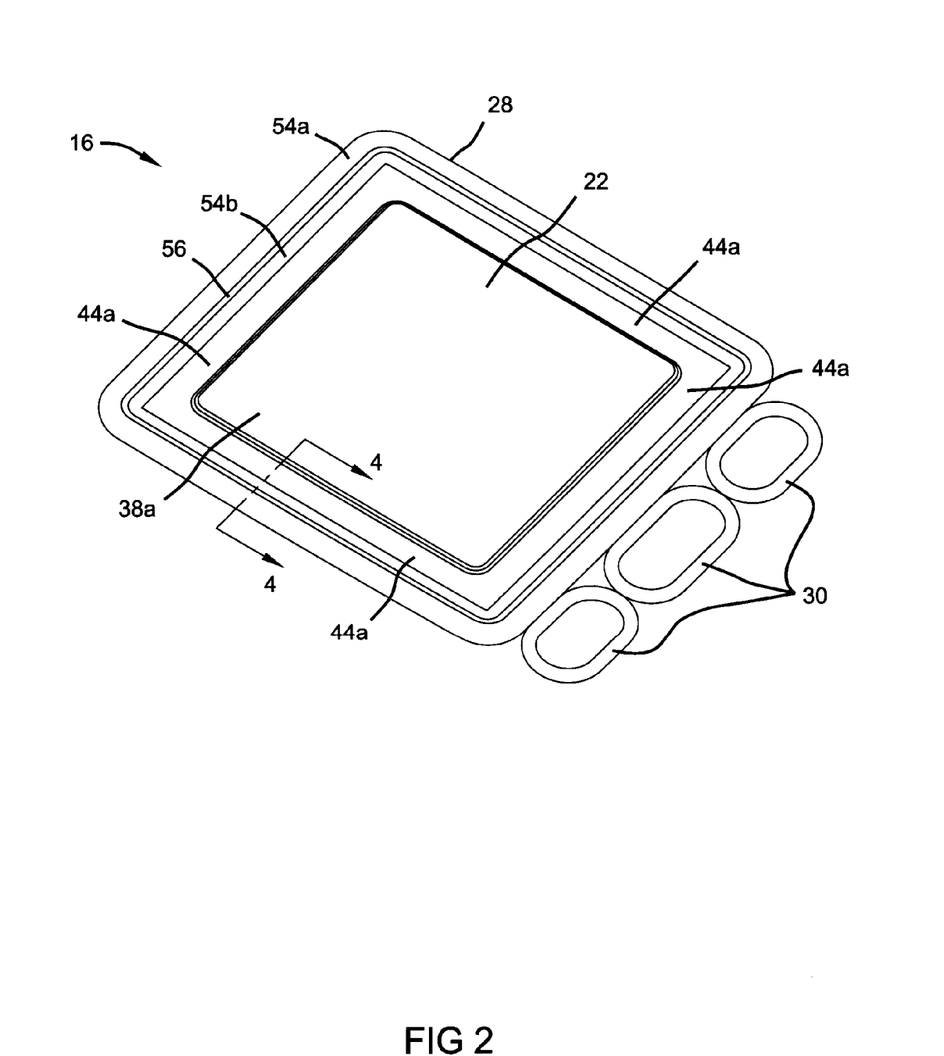
FIG. 2 is a perspective view of the MEA of FIG. 1.
Figure 3:
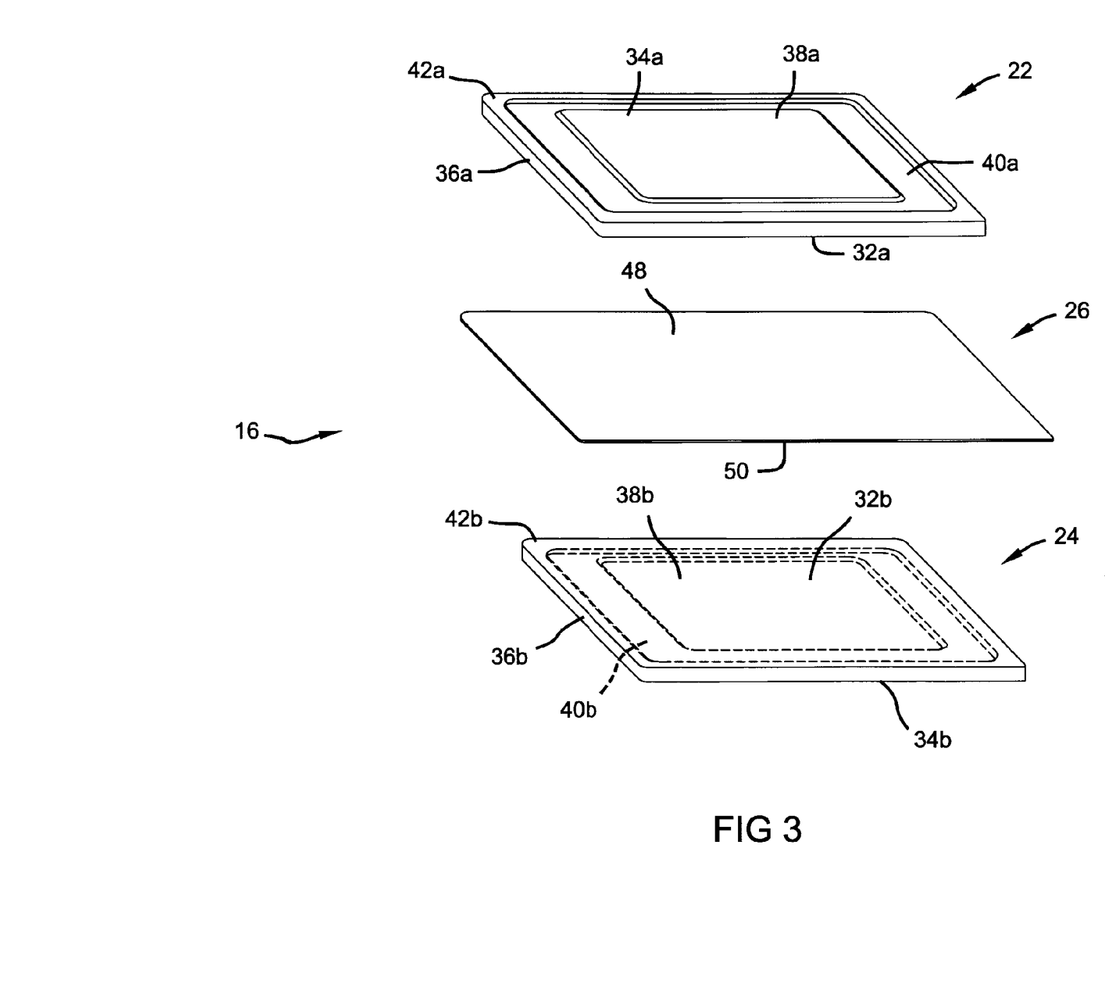
FIG. 3 is an exploded view of the MEA of FIG. 1 illustrated without the gasket seal for clarity.
Figure 4:
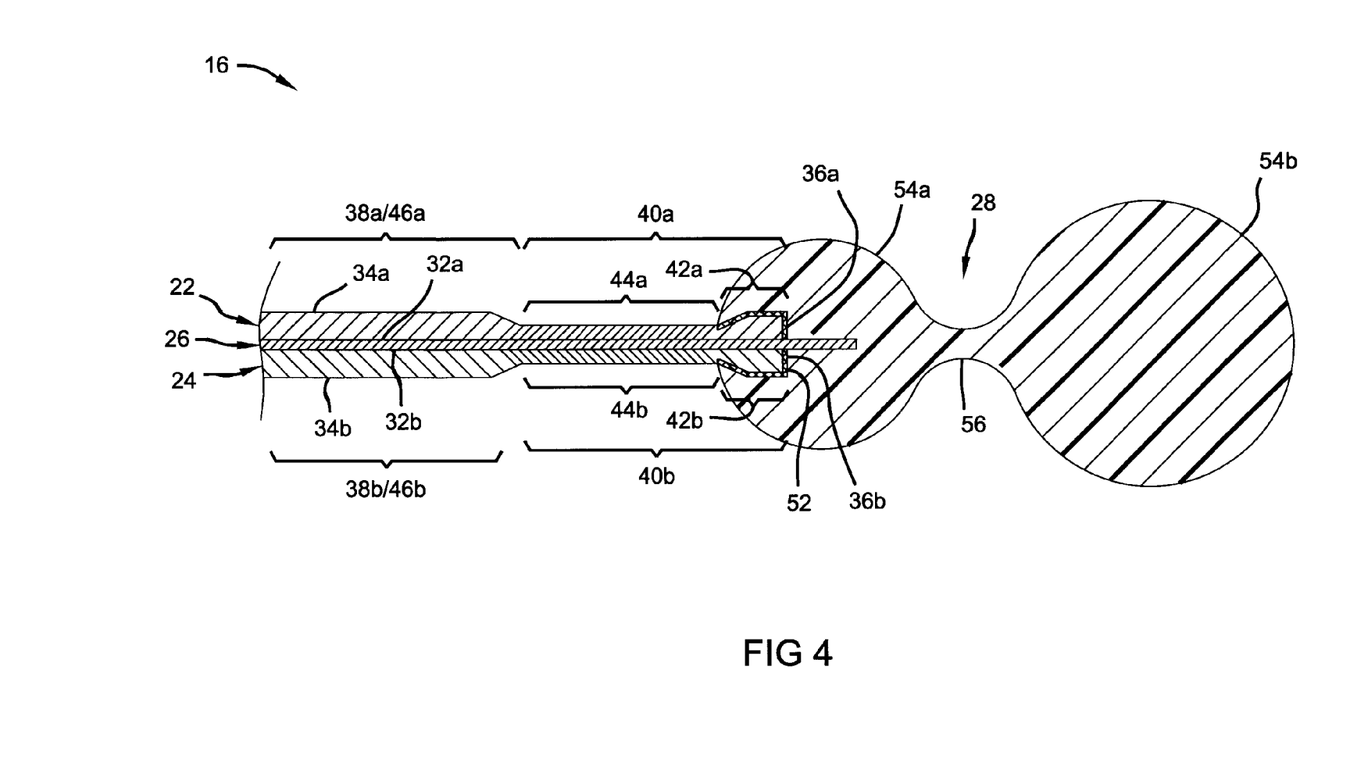
FIG. 4 is a cross-sectional view taken along line 4-4 of FIG. 2.

With additional reference to FIGS. 2-4, the MEA 16 generally includes a first gas diffusion layer 22, a second gas diffusion layer 24, an ion exchange membrane 26 disposed between the first and second gas diffusion layers 22 and 24, a seal 28 (not shown in FIG. 3 for clarity) mounted to the diffusion layers 22 and 24, and MEA manifold ports 30.

The first and second gas diffusion layers 22 and 24 are substantially the same. Therefore, like reference numbers are used to designate features of the diffusion layers 22 and 24 that are similar or the same. When it is necessary to distinguish between the first and second diffusion layers 22 and 24, such as in the figures, the letter "a" is used to designate features of the first diffusion layer 22 and the letter "b" is used to designate features of the second diffusion layer 24.

The first and second diffusion layers 22 and 24 each include an inner surface 32 and an outer surface 34 that is opposite the inner surface 32. The inner surfaces 32 face the membrane 26. The outer surface 34a of the first diffusion layer 22 faces the first support plate 12 and the outer surface 34b of the second gas diffusion layer 24 faces the second support plate 14.

Each of the diffusion layers 22 and 24 include a side surface 36 that is located between the inner surface 32 and the outer surface 34. Specifically, the side surfaces 36 are located at an outer edge of the inner and outer surfaces 32 and 34 respectively. The side surfaces 36 define an outer perimeter of the first and second diffusion layers 22 and 24.

The gas diffusion layers 22 and 24 each further include an inboard region 38 and an outboard region 40. The inboard regions 38 are at a center of the diffusion layers 22 and 24. The outboard regions 40 are at a periphery of the diffusion layers 22 and 24 and extend about the perimeter of the diffusion layers 22 and 24 at the side surfaces 36. The outboard regions 40 surround the inboard regions 38. Thus, the outboard regions 40 are proximate to the side surfaces 36 and the inboard regions 38 are distal to the side surfaces 36.

With particular reference to FIG. 4, the outboard regions 40 each include a low density region 42 and a high density region 44. The low density regions 42 are at, or at least proximate to, the side surfaces 36. The low density regions 42 extend about the entire, or substantially the entire, perimeter of the diffusion layers 22. The low density regions 42 extend from between about 0.5 mm to about 10 mm, preferably about 4 mm, inward from the side surfaces 36 toward the inboard regions 38. The thickness of the low density regions 42, which is the distance between the outer surface 34a of the first diffusion layer 22 and the outer surface 34b of the second diffusion layer 24 including the thickness of the membrane 26, is approximately 0.48 mm.

The high density regions 44 are between each of the inboard regions 38 and the low density regions 42. The high density regions 44 extend about the entire, or substantially the entire, perimeter of the diffusion layers 22 and are more dense than the low density regions 42. The high density regions 44 can be of most any structural form that is sufficient to provide the diffusion layers 22 and 24 with an increased density at the high density regions 44 as compared to the low density regions 42.

The diffusion layers 22 and 24 are generally porous. The diffusion layers 22 and 24 can be made of a variety of materials known in the art, such as carbon fiber paper, which is generally comprised of a plurality of intertwined carbon fibers.

In applications where the diffusion layers 22 and 24 are made of carbon fiber paper, the increased density of the high density regions 44 can be due to decreased spacing between the carbon fibers in the high density regions 44 as compared to the low density regions 42. This decreased spacing can be provided in a variety of different ways, such as by compressing or "pinching" the layers 22 and 24 during the MEA 16 manufacturing process.

In applications where the high density regions 44 are provided by compressing the diffusion layers 22 and 24, as illustrated in the figures, the high density regions 44 have a reduced thickness or height as compared to the low density regions 42 and the inboard regions 38 when the diffusion layers 22 are viewed in the cross-section of FIG. 4. In other words, the outer surfaces 34 are closer to the inner surfaces 32 in the area of the high density regions 44 than in the area of the low density regions 42 or the inboard regions 38.

The thickness of the overall MEA at the high density region 44, which is the distance from the outer surface 34a of the first diffusion layer 22 to the outer surface 34b of the second diffusion layer 24 including the thickness of the ion exchange membrane 26, is approximately 0.43 mm, but can be any other suitable thickness. The high density region 44 can be located, for example, from between about 0.5 mm to about 10 mm, preferably about 4 mm, inboard from the side surface 36 and can be approximately 1.5 mm in length, or any other suitable thickness.

While the high density region 44 is illustrated as having a reduced height or thickness as compared to the low density region 42 in the cross-section of FIG. 4, the high density region 44 can have a thickness that is uniform with the remainder of the diffusion layers 22 and 24 as long as the high density region 44 has a higher density than the low density region 42. The high density region 44 can be of a variety of different densities, such as up to about 50% more dense than the inboard region 38 and/or the low density region 42.

In most applications the inboard regions 38 have a density that is approximate to, or the same as, the low density regions 42 of the outboard region 40. The inboard region 38 is therefore a low density region 46 itself. However, in some applications the inboard region 38 can have a density that is greater or less than the low density region 42 of the outboard region 40. The thickness of the overall MEA 16 at the low density region 46, which is the distance from the outer surface 34a of the first diffusion layer 22 to the outer surface 34b of the second layer 24 including the thickness of the ion exchange membrane 26, can be approximately 0.48 mm or any other suitable thickness.

The first and second gas diffusion layers 22 and 24 are electrically conductive. As a result, the diffusion layers 22 and 24 are commonly referred to as electrodes.

The ion exchange membrane 26 is typically a polymer electrolyte membrane that conducts only positively charged ions. The membrane 26 prohibits the passage of electrons. Any suitable fuel cell membrane known in the art can be used. The membrane 26 typically includes a top surface 48 and a bottom surface 50. The top surface 48 abuts the inner surface 32a of the first gas diffusion layer 22 and the bottom surface 50 abuts the inner surface 32b of the second gas diffusion layer 24.

As best illustrated in FIG. 4, the membrane 26 is sized to extend laterally beyond the diffusion layers 22 and 24. In other applications, the membrane 26 can be coextensive with the first and second diffusion layers 22 and 24 such that it terminates at the side surfaces 36. The membrane 26 can also be sized to terminate inboard of the side surfaces 36.

The portion of the membrane top surface 48 facing the inboard region 38a of the first gas diffusion layer 22 is coated with an anode catalyst (not shown). The portion of the bottom surface 50 facing the inboard region 38b of the second gas diffusion layer 24 is coated with a cathode catalyst (not shown). The catalysts can be any suitable catalyst known in the art, such as Nafion®. The portions of the ion exchange membrane 26 that oppose the outboard regions 40 of the gas diffusion layers 22 and 24 may not be, but in some applications can be, coated with the catalyst.

The areas of the MEA 16 where the catalyst opposes the inboard regions 38 of the gas diffusion layers 22 and 24 are the active regions of the MEA 16. The areas of the MEA 16 where the portions of the membrane 26 not covered with the catalyst oppose the outboard regions 40 are the inactive regions of the MEA 16. The chemical reactions generating electrons and water take place in the active regions. No reactions take place in the inactive regions.

As most clearly illustrated in FIGS. 2 and 4, the seal 28 is mounted about the peripheral edge of the MEA 16. Specifically, the seal 28 is mounted to the outer surfaces 34a and 34b at the outboard low density region 42 and to the side surfaces 36a and 36b. In applications where the membrane 26 extends from beyond the first and second diffusion layers 22 and 24, as illustrated in FIG. 4, the seal 28 is also mounted to and mounted over the portion of the membrane 26 that protrudes from between the first and second diffusion layers 22 and 24. The seal 28 applies a compression force to the membrane 26.

The seal 28 impregnates the diffusion layers 22 and 24 at an impregnation region 52. Specifically, the seal is impregnated within the outboard low density regions 42 and within the side surfaces 36. Impregnating the seal 28 at the impregnation region 52 enhances the interface between the seal 28 and the diffusion layers 22 and 24.

As most clearly illustrated in FIG. 4, the seal 28 includes an inner projection, rim, or bead 54a and an outer projection, rim, or bead 54b. The beads 54 extend completely around the seal 28. The beads 54 are connected by an interconnecting bridge region 56 and are thus integral with each other. As illustrated, each bead 54 is substantially cylindrical. However, the beads 54 can be of most any suitable shape. While the present invention is illustrated as including two beads 54, the seal 28 can include a single bead 54, more than two beads 54, or no beads 54 at all.

The beads 54 can be of various different sizes depending on numerous factors, such as the size of the fuel cell 10 and the application. Preferably, the inner bead 54a has a smaller area or radius than the outer bead 54b. In many applications the inner bead has as radius of approximately 0.3 mm and the outer bead 54b has a radius of approximately 0.69 mm.

The seal 28 can be made of a variety of different materials known in the art that are at least substantially impermeable to gas, such as oxygen and hydrogen. The seal 28 is typically an elastomer, such as a thermosetting liquid injection moldable compound. For example, the seal 28 can be made of one or more of the following materials: silicone, fluorosilicone elastomer, fluorocarbon elastomer, and ethylene propylene diene monomer elastomer.

The MEA 16 further includes MEA manifold ports 30. As illustrated in FIGS. 1 and 2, the MEA ports 30 are integral with the seal 28 and made of the same material as the seal 28. The MEA ports 30 are aligned with the manifold ports 18a and 18b of the first and second plates 12 and 14. The MEA ports 30 are individual passageways that permit the passage of gases between the manifold ports 18a and 18b.

An exemplary process for manufacturing the fuel cell 10 will now be described in detail. To manufacture the MEA 16, the gas diffusion layers 22 and 24 are laminated to opposite sides of the membrane 26 using any of a variety of different devices and methods known in the art.

The diffusion layers 22 and 24 and the membrane 26 are placed in a suitable molding tool (not shown) to form the high density region 44 and install the seal 28. The molding tool can also be used to laminate the diffusion layers 22 to the membrane 26, as is known in the art. The molding tool can be any suitable molding tool that is commonly used in the art, such as an injection molding tool. The molding tool includes a mold with two mold halves that mirror the diffusion layers 22 and 24.

The mold includes protruding features that mirror the high density regions 44. The protruding features extend from both halves of the mold to a distance equal to the difference in thickness between the high density region 44 and the low density regions 42 and 46. Therefore, when the mold halves are closed and heat is applied, the protruding regions compress the first and second diffusion layers 22 and 24 at the high density regions 44. Compressing the first and second diffusion layers 22 and 24 increases the density of the diffusion layers 22 and 24 to form the high density regions 44.

The mold halves each further include an annular recess that extends about the perimeter of the mold and mirrors the areas where the MEA manifold ports 30 are to be formed. When the mold halves are closed the recesses form a cavity at the low density regions 42, at the portion of the membrane 26 that protrudes from between the first and second diffusion layers 22 and 24, and form cavities in the areas where the MEA manifold ports 30 are to be formed. The cavity at the low density regions includes an inner chamber and an outer chamber. The inner chamber receives the low density region 42 and the protruding portion of the membrane 26. The outer chamber is laterally spaced apart from the first and second diffusion layers 22 and 24. The inner chamber is smaller than the outer chamber.

To form the seal 28 and the MEA ports 30 the elastomer is heated to a liquid and is injected within the mold cavities formed by the recesses present in each mold half. The liquid elastomer flows within, or impregnates, the porous diffusion layers 22 and 24 at the outboard low density regions 42. Impregnation of the diffusion layers 22 and 24 with the liquid elastomer is enhanced due to the decreased density of the low density regions 42, as compared to the high density regions 44.

The inner and outer chambers receive the heated elastomer to form the inner and outer seal beads 54a and 54b respectively. The smaller volume of the inner chamber provides the inner bead 54a with a smaller volume or radius than the outer seal bead 54b.

The high density regions 44 are advantageous because they restrict passage of the liquid elastomer. Compressing the diffusion layers 22 and 24 in this region 44 presses the fibers of the diffusion layers 22 and 44 closer together and closes the pores between the fibers. Therefore, no passages are available through the high density regions 44 and the liquid elastomer is confined to the low density regions 42. Restricting the elastomer to the low density regions 42 keeps the elastomer out of the inboard regions 38 and the active areas where the presence of the elastomer may render the MEA 16 inactive.

The elastomer is next heat cured solid to form the seal 28 and the MEA ports 30. The portion of the elastomer impregnated within the diffusion layers 22 and 24 hardens to form a mechanical interlock between the seal 28 and the diffusion layers 22 and 24. This mechanical interlock greatly enhances the sealing properties of the seal 28. The hardened seal 28 also exerts pressure on the portion of the membrane 26 that protrudes within the seal 28 to increase the effectiveness of the seal 28 about the membrane 26.

The completed MEA 16 is next secured between the support plates 12 and 14 to complete the fuel cell 10. The MEA 16 is orientated such that the manifold ports 18 of the support plates 12 and 14 are aligned with the MEA manifold ports 30. The MEA 16 is held in place between the support plates 12 and 14 by an external loading mechanism that is known in the art (not shown).

Multiple fuel cells 10 can be combined to form a fuel cell stack (not shown), as is known to those skilled in the art. In a fuel cell stack, the electrical output of each fuel cell 10 is combined to increase the voltage potential.

The operation of the fuel cell 10 will now be described. Hydrogen is supplied to the first support plate 12 through one of the manifold ports 18a of the first plate 12. Oxygen is supplied to the second support plate 14 through one of the manifold ports 18b of the second plate 14. To cool the fuel cell 10, coolant can be supplied to one or both of the plates 12 and 14 through the manifold ports 18. The hydrogen and oxygen are distributed through different ports 18 to insure that the hydrogen and oxygen remain separate. The MEA manifold ports 30 provide a channel for the passage of gas past the MEA 16, which is particularly useful when the fuel cell 10 is part of a fuel cell stack to permit the distribution of oxygen, hydrogen, and air across the different fuel cells 10.

Hydrogen supplied to the first plate 12 via the ports 18a travels throughout the flow field channels 20a where the hydrogen is distributed to the first gas diffusion layer 22. Therefore, the first diffusion layer 22 serves as the anode. Oxygen supplied to the second plate 14 via the ports 18b travels throughout the flow field channels 20b where the oxygen is distributed to the second diffusion layer 24. Therefore, the second gas diffusion layer 24 serves as the cathode.

The hydrogen gas ($H_2$) diffuses through the first diffusion layer 22 where it reacts with the catalyst. The reaction with the catalyst yields two $H^+$ ions and two electrons. The electrons are conducted via the first diffusion layer 22 to a circuit to provide current to the circuit. The current can be used for a variety of purposes, such as to power and turn a motor. The electrons are directed via the circuit to the second diffusion layer 24.

Simultaneously, the oxygen gas ($O_2$) supplied to the second diffusion layer 24 reacts with the catalyst to yield two oxygen atoms. The oxygen atoms have a strong negative charge. This negative charge attracts the $H^+$ ions through the membrane 26. The $H^+$ ions bond with an oxygen atom and two of the electrons from the circuit to form a water molecule ($H_2O$).

The membrane 26 isolates the hydrogen and oxygen molecules to prevent a reaction between the two. The portion of the membrane 26 that extends beyond the first and second diffusion layers 22 prevents migration of oxygen and/or hydrogen around the side surfaces 36, thereby further isolating the hydrogen and oxygen.

The seal 28 also helps to isolate the hydrogen and oxygen and prevent escape of these gases into the surrounding atmosphere. As illustrated in FIG. 4, the seal 28 covers and seals the diffusion layers 22 and 24 at the low density regions 42. The seal is impregnated within the outer surfaces 34 and the side surfaces 36 of each of the diffusion layers 22 and 24. The seal 28 also applies a compression force to the portion of the ion exchange membrane 26 that extends beyond the first and second diffusion layers 22 and 24.

The position of the seal 28 over the membrane 26 prevents cross migration of oxygen and gas between the first and second layers 22 and 24 around the membrane 26. Impregnation of the inner seal bead 54a within the diffusion layers 22 at the impregnation region 52 prevents hydrogen and oxygen from escaping from the MEA 16 into the surrounding atmosphere. The outer bead 54b provides redundancy to further prevent the escape of hydrogen and oxygen into the atmosphere.

In some applications, the inner seal bead 54a is smaller than the outer bead 54b. More specifically, the inner bead 54b can have a smaller radius than the outer bead 54b, as illustrated in the cross-sectional view of FIG. 4. Providing an inner bead 54a with a smaller radius than the outer bead 54b is advantageous because it allows the inner bead 54a to fit between the two support plates 12 and 14 without being damaged. Further, because the inner bead 54a is of a reduced size, it is not subject to as much movement or disruption from external forces as a larger bead is subject to, thereby preserving the integrity of the inner bead 54a and the integrity of the interlock between the inner bead 54a and the diffusion layers 22 and 24.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for manufacturing a fuel cell membrane electrode assembly having an ion exchange membrane affixed between a first gas diffusion layer and a second gas diffusion layer, the method comprising the steps of:

positioning the first and the second gas diffusion layers with the membrane in-between between two halves of a thermo-mold assembly, each mold half having a protruding region that mirrors the location of a high density region to be formed in the first and second gas diffusion layers at an outboard region that extends about a periphery of the first and second diffusion layers at a location spaced inward from an outer perimeter edge of the first and second gas diffusion layers;

closing the mold halves under heat such that the protruding regions of the mold halves compress the first and the second diffusion layers at the high density regions to increase the density of the first and second diffusion layers at the high density regions;

injecting an elastomeric material that is heated to a liquid within a cavity of the closed mold, the cavity located about the periphery of the membrane electrode assembly at a low density region that is outboard of the high density region, the liquid elastomer flows within and impregnates the first and second diffusion layers at the low density region; and curing the liquid elastomeric material to form an elastomeric seal that is impregnated within and forming a seal bead overtop of the first and second diffusion layers at the low density region and extends around side surfaces of the first and second diffusion layers at a perimeter of the first and second diffusion layers.

2. The method of claim 1, wherein said injecting step further comprises injecting the liquid elastomeric material within the cavity having an inner chamber connected to an outer chamber surrounding the inner chamber such that the seal formed after said curing step includes an inner rim and an outer rim, the inner rim impregnates the first and second gas diffusion layers and the outer rim extends laterally from the first and second gas diffusion layers.

3. The method of claim 2, wherein the inner chamber has a smaller volume than the outer chamber such that the inner rim of the seal has a smaller diameter than the outer rim.

* * * * *